United States Patent
Ruiz Ortega et al.

(10) Patent No.: US 8,882,315 B2
(45) Date of Patent: Nov. 11, 2014

(54) EXTERNAL REAR-VIEW MIRROR ASSEMBLY HAVING A HOUSING COMPRISING A CIRCUIT BOARD SUPPORTING A PLURALITY OF LIGHT EMITTING DIODES

(75) Inventors: Juan Nestor Ruiz Ortega, Barcelona (ES); Maria Luisa Novella Requena, Barcelona (ES)

(73) Assignee: Fico Mirrors, S.A., Barcelona (ES)

( * ) Notice: Subject to any disclaimer, the term of this patent is extended or adjusted under 35 U.S.C. 154(b) by 70 days.

(21) Appl. No.: 13/697,903

(22) PCT Filed: May 31, 2011

(86) PCT No.: PCT/EP2011/058997
§ 371 (c)(1),
(2), (4) Date: Dec. 3, 2012

(87) PCT Pub. No.: WO2011/151352
PCT Pub. Date: Dec. 8, 2011

(65) Prior Publication Data
US 2013/0083552 A1    Apr. 4, 2013

(30) Foreign Application Priority Data
May 31, 2010   (EP) .................................. 10164507

(51) Int. Cl.
*B60Q 1/34*       (2006.01)
*F21S 8/10*       (2006.01)
*B60Q 1/26*       (2006.01)
*F21Y 101/02*     (2006.01)

(52) U.S. Cl.
CPC ............. *B60Q 1/2665* (2013.01); *B60Q 1/34* (2013.01); *F21S 48/2225* (2013.01); *B60Q 1/2607* (2013.01); *F21S 48/215* (2013.01); *F21Y 2101/02* (2013.01)
USPC ............ 362/494; 362/545; 362/511; 362/540

(58) Field of Classification Search
USPC .......................... 362/494, 545, 511, 540, 541
See application file for complete search history.

(56) References Cited

U.S. PATENT DOCUMENTS 6,637,917 B2 * 10/2003 Schwanz et al. .............. 362/487
7,690,823 B2 *  4/2010 Miguel Sanz et al. ........ 362/494
(Continued)

FOREIGN PATENT DOCUMENTS

DE       102007013082 A2    9/2008
EP          0947761 A1     10/1999
(Continued)

OTHER PUBLICATIONS

Prevot, E., "International Search Report", for PCT/EP2011/058997, as mailed Oct. 6, 2011, 6 pages.

*Primary Examiner* — Laura Tso
(74) *Attorney, Agent, or Firm* — Winstead PC

(57) ABSTRACT

External rear-view mirror assembly comprising a housing (1), a circuit board (3) supporting a plurality of LEDs LED-1, LED-2, an opaque cover (5) arranged in front of the circuit board (3) and provided with a plurality of through holes (5*a*), said cover having a shape adapted to the front external surface (1*a*) of the rear-mirror (1), which comprises at least a prism (6) with a first surface (6*a*) in contact with at least a LED 4, and a second surface (6*b*) fitting within at least one of said holes (5*a*) and aligned with the front external surface (5*b*) of the cover (5), said second surface (6*b*) being a Fresnel lens adapted to direct the light coming from said LED 4 in a predetermined direction D.

21 Claims, 6 Drawing Sheets

(56) References Cited

U.S. PATENT DOCUMENTS

| | | |
|---|---|---|
| 2005/0270791 A1 | 12/2005 | Lee |
| 2007/0290829 A1* | 12/2007 | Geiger et al. ............... 340/475 |
| 2008/0089080 A1* | 4/2008 | Kawaji et al. ............... 362/494 |
| 2010/0309677 A1* | 12/2010 | Kazaoka ...................... 362/519 |
| 2011/0058385 A1* | 3/2011 | Kazaoka et al. ............. 362/540 |
| 2011/0122647 A1* | 5/2011 | Schmierer ................... 362/555 |

FOREIGN PATENT DOCUMENTS

| | | |
|---|---|---|
| EP | 1 746339 A1 | 1/2007 |
| EP | 1750054 A1 | 2/2007 |
| EP | 1854667 A1 | 11/2007 |
| EP | 2012056 A1 | 1/2009 |
| WO | WO-2005/098310 A1 | 10/2005 |

* cited by examiner

EXTERNAL REAR-VIEW MIRROR ASSEMBLY HAVING A HOUSING COMPRISING A CIRCUIT BOARD SUPPORTING A PLURALITY OF LIGHT EMITTING DIODES

The present application relates to external rear-view mirrors having signalling modules using light emitting diodes (LEDs).

BACKGROUND

Light emitting diodes, LEDs, are increasingly being used in vehicles. Light emitting sources consume less energy compared to traditional incandescent light sources and have an improved lifespan. LEDs can serve for signalling functions.

Paradigmatic to devices serving as signalling function are blinkers. These lights are used as turn signals for cars and vehicles. Another signalling function is the Day Running Lamp (DRL) which is a lamp which beam is oriented in the forward direction used to make the vehicle more easily visible when driving during daytime.

Vehicle lights, especially when arranged within external rear-view mirrors, can only make use of limited space. Moreover, rear-view mirror have highly curved external surfaces that do not allow simple arrangements of light sources.

The prior art proposes several arrangements for adapting electrical and electronic circuits to curved surfaces and small spaces. Document US20050270791 discloses a vehicle light system comprising several light sources, typically light emitting diodes, positioned on different planes. Said planes are disposed in a staggered fashion defining step portions. The overall surfaces of said portions has to accommodate the shape and size of external surfaces of a car.

The object of the present invention is to provide a lighting system on a rear-view mirror surmounting space limitation and highly curved external surfaces and geometries and yet capable of providing an efficient signalling system for the vehicle.

Moreover, external rear-view mirrors are particularly prone to damage. These external units have to stick out from the car main body being exposed to increased tear and wear, changing climate conditions and vandalism. Yet another object of the present invention is to obtain a rear-view mirror that is rugged and can withstand the wear and tear of driving conditions.

A further object of the invention is to provide an optical system for rear-view mirrors that has a light weight and can spare on the amount of materials needed for the optical components.

DESCRIPTION OF THE INVENTION

The present invention solves at least one of the problems mentioned above by providing optical elements with geometries, especially branched surfaces, that allow an optimal use of scarce space in external rear-view modules.

Specifically, this is achieved by means of an assembly, having a housing comprising a circuit board supporting a plurality of light emitting diodes, characterised by at least one optical element with a first light input surface optically connected to a first light emitting diode, with a second light input surface optically connected to a second light emitting diode, wherein said optical element is configured for directing light coming for said first and second light emitting diodes onto a common light output surface, whereby both light emitting diodes have a signalling function.

Preferably, the first light emitting diode is configured to have a vehicle day running light function and/or the second light emitting diode is configured to have a blinker function.

More preferably, the common light output surface is parallel to an external surface of said housing and wherein said optical element is configured for directing light coming from said first light emitting diode onto a predetermined direction, preferably the driving direction of the vehicle.

More optional features of the assembly of the invention are the following:
- it comprises a cover for the circuit board, wherein said cover is provided at least with one through hole attached to said common light output surface.
- the first light input surface faces the first light emitting diode, though separated with a gap typically in the range comprised between 0.4 and 0.5 mm, and the common light output surface is in contact with the optical element.
- the first light input surface defines a first leg or branch and wherein said second light input surface defines a second leg or branch, said first and second legs or branches arranged so as to achieve a light weight optical element.
- the optical element is a non dispersive optical prism.
- the common light output surface of the optical element is configured as a Fresnel lens.

The invention also refers to an assembly for a vehicle having a housing comprising a circuit board supporting a plurality of light emitting diodes, characterised by at least one optical element with a first light input surface optically connected to a first light emitting diode and a light output surface, wherein said optical element is configured for directing light coming for said first light input surface onto said light output surface and to direct light coming from said first light emitting diode onto a predetermined direction and wherein said light output surface is parallel to an external surface of said rear-mirror view housing, and wherein preferably the optical element is configured to define two or more light output branches impinging on said light output surface at different spots.

The invention further refers to an assembly for a vehicle comprising a housing and at least a circuit board supporting a plurality of light emitting diodes, characterised in that said circuit board is flat and in that it comprises at least one optical element for directing light coming for said light emitting diodes onto a predetermined direction, and which can include the following optional features:
- the optical element has a first light input surface optically connected to a first light emitting diode and a light output surface, wherein said optical element is configured for directing light coming for said first light input surface onto said light output surface, and wherein said light output surface is parallel to an external surface of said rear-mirror view housing.
- the optical element comprises a first light input surface optically connected to a first light emitting diode, a second light input surface optically connected to a second light emitting diode, wherein said optical element is configured for directing light coming for said first and second light emitting diodes onto a common light output surface, whereby said first and second light emitting diode have a signalling function.
- the first light emitting diode is configured to have a vehicle day running light function and/or
- the second light emitting diode is configured to have a blinker function.
- it further comprising an opaque cover provided with a plurality of through holes and arranged in front of the circuit board, said cover having a surface parallel to the external cover of the rear-view mirror housing.

it comprises a module, wherein said module includes at least a base, optical elements and an external cover.

at least part of the outer surface of the optical element is mirrored so as to prevent light escaping the optical element.

In any of the assemblies of the invention previously described the circuit board can be arranged in a single plane or in a series of supporting steps. In the latter case the LEDs are placed every other step, said steps supporting LEDs being destined to be placed perpendicular to the longitudinal direction of the vehicle when said assembly is mounted on the vehicle.

Finally, the invention refers also to an external rear-view mirror for a vehicle comprising any assembly of the invention previously described.

Therefore, the invention provides for an assembly for rear view mirrors that proposes an efficient use of space and which is also capable of simultaneously accommodating a plurality of signalling functions without prejudice to achieving a compact arrangement.

BRIEF DESCRIPTION OF THE DRAWINGS

A number of embodiments are shown in the drawings. However, none of these embodiments is understood to constrain the scope of the invention.

FIG. 2b shows a detail of FIG. 2a.

FIG. 3b shows a detail of FIG. 3a.

FIG. 4b shows a detail of FIG. 4a.

DESCRIPTION OF PREFERRED EMBODIMENTS OF THE INVENTION

As said above, highly curved external surfaces in rear-view mirrors do not allow simple arrangements of light sources. This results in complicated shapes and surfaces for light emitting diodes lighting systems having difficult geometries for manufacturing.

Figure 1:
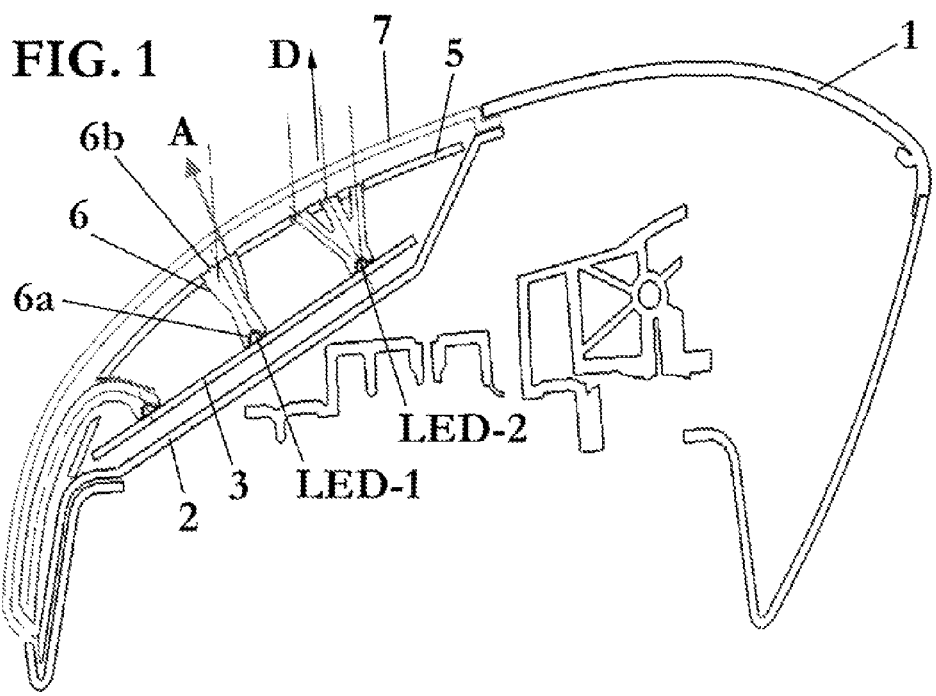
FIG. 1 shows an assembly for rear view mirror with a number of optical elements and a circuit board comprising a plurality of LEDS.

The embodiment shown in FIG. 1 show a flat circuit board 3 comprising a number of light emitting diodes LED-1, LED-2. Said light emitting diodes may emit any desired colour or a combination of colours. Choice of colours may include amber if a blinker function is desired or white light if front vehicle illumination is desired. The spectral behaviour of each individual light emitting diode can be tailor made to a specific function and its output light strength and optical aperture chosen to meet specific needs in rear-view mirror applications.

As can be seen, a flat circuit board 3 is particularly advantageous as it provides a simple module that can be fitted to a number of different rear-view mirror designs. As mentioned before, manufacturing of said circuit boards 3 is simple. Additionally flat geometries allow the manufacture of simple modular lighting modules, especially of mounting component on the circuit board 3.

Advantageously, a light emitting module comprises a base 2 which is fitted, fixed or attached to the rear-view mirror and an external cover 7. Said external cover 7 preferably makes part of the external surface of said rear-view mirror housing 1. Said external cover 7 is normally made of transparent material.

Figure 2A:
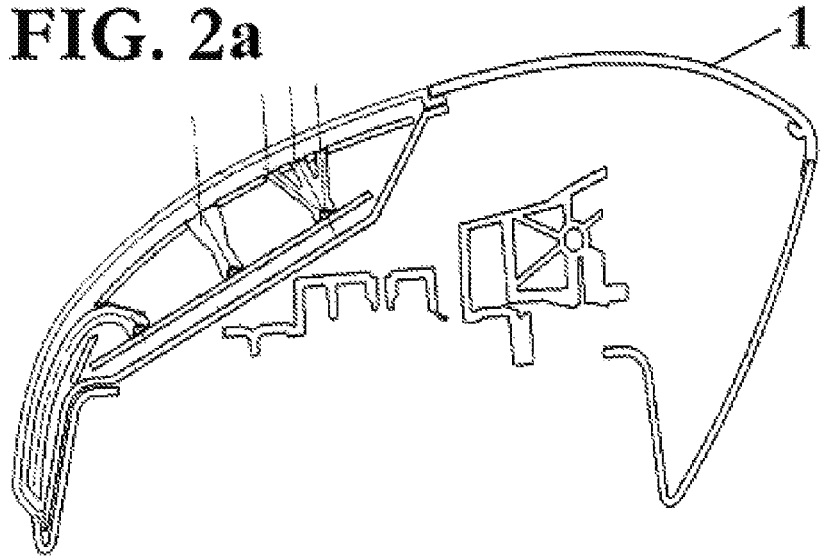
FIG. 2a shows an embodiment of an optical element having geometrical arrangements on its surfaces.
Figure 2B:
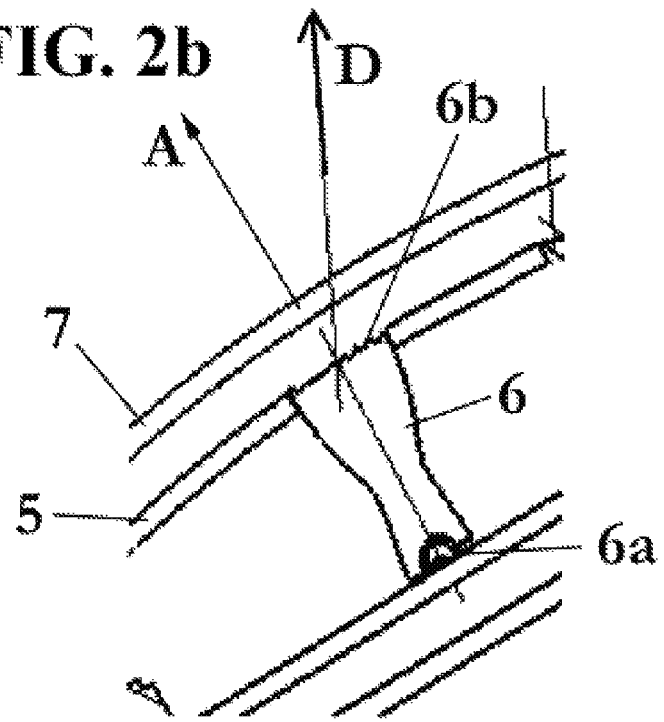

FIG. 2b show a detailed part of an optical element 6. The optical element is typically a non dispersive prism for guiding and changing the direction of light travel. The optical element 6 preferably uses total internal reflection to minimize light loses.

Light emitting diodes LED1, LED-2 have a preferred emitting direction A. Radiation can be directed or scattered to any direction, but light emitting diodes are preferably configured so as to send the bulk of light in a predetermined emitting direction A. This direction A is advantageously perpendicular to the circuit board 3 main surface. The optical element 6 can show several degrees of symmetry. As can be shown in FIGS. 2a and 2b, a rotational symmetry around an axis parallel to the emitting direction A can be shown. If the optical element shows a number of branches, individual symmetries of each branch are possible.

Advantageously, the light output surface 6b of the optical element 6 is built as Fresnel lens which redirects or collimates light from emitting direction A onto a predetermined direction D efficiently. The optical element is typically a non dispersive prism for guiding and changing the direction of light travel. The optical element 6 preferably uses total internal reflection to minimize light loses. Waveguides may also be used instead.

Most conventional vehicle light systems use light emitting diodes and one or more lenses for collimating light in a fixed direction. The lenses are conventionally placed close to the light source and they aim to collimate light onto a predetermined direction. Said arrangement has a light output surface cross section which is perpendicular to the predetermined direction mentioned above. For the purposes of gathering and strengthening light intensity the bigger the light output surface the better. A preferred embodiment in the present invention is to maximize light output surface by making surfaces of optical elements 6 parallel to the external surfaces of the rear-view mirror modules.

The optical element 6 comprises a first light input surface 6a in optical connection with a first light emitting diode LED-1. A particularly simple optical performance is achieved if said first light input surface 6a faces said first light emitting diode LED-1. Optical losses can thus be minimized and with increased light output and a better thermal behaviour.

Furthermore, if the optical distance bridging a light emitting diode to a light output surface 6b is made within a single optical medium, light losses are reduced even further. Thus, the optical element 6 is preferably in contact with the light output surface 6b.

In order to maximize light output surface, the light output surface 6b is preferably parallel to an external surface of the rear-view mirror housing 1. The output surface of light allows for more light power and for a surface compatible with the overall dimension of the rear-view mirror.

External rear-view mirrors are particularly prone to damage. These external units have to stick out from the car main body being exposed to increased tear and wear, changing climate conditions and vandalism. Advantageously, the optical elements 6 bridging the distance between the circuit board 3 and an cover 5 will provide a stable mechanical system with an increased number of joints between the circuit board 3 and the cover 5. The overall system will be more rugged and less prone to structural or mechanical damage. Thus, a rear-view mirror is obtained that is rugged and can withstand the wear and tear of driving conditions.

Figure 3A:
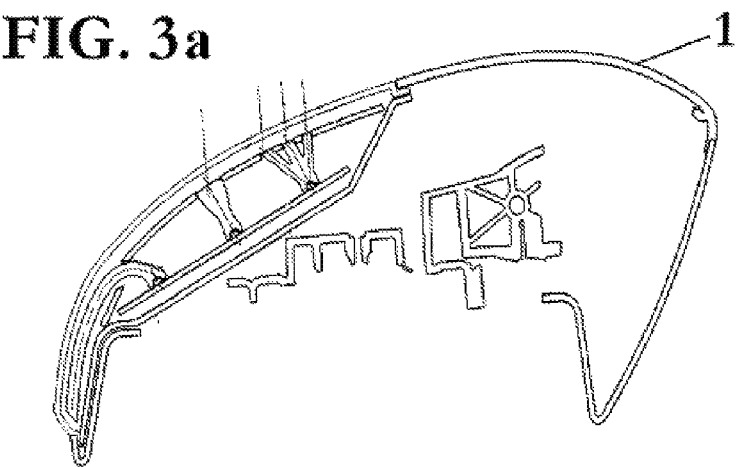
FIG. 3a shows an optical element configured with branched light output surfaces.
Figure 3B:
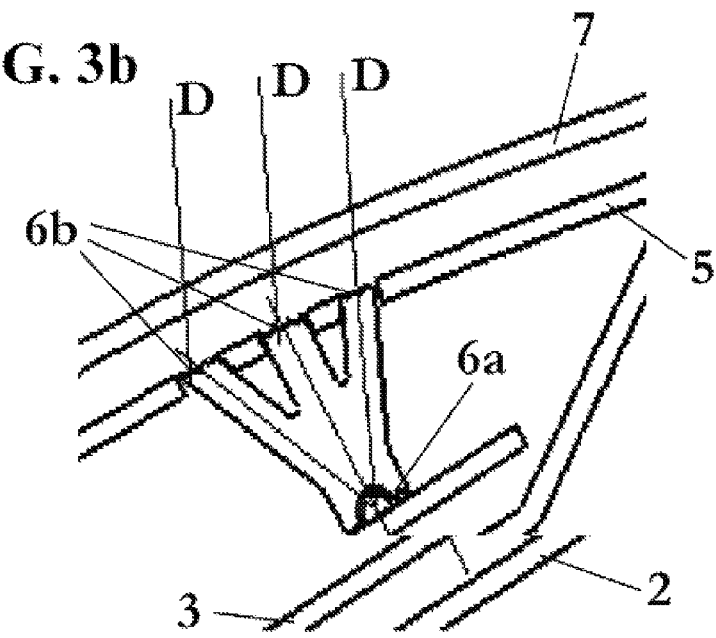

FIGS. 3a and 3b shows another embodiment of the present invention. The light output surface shows a plurality of legs or branches 6b which impinge on selected through holes on a cover 5 surface. With said arrangement, a number of light beams can be selected without increasing the number of optical elements 6 and light emitting diodes LED-1, LED-2 present in the system.

If necessary, said cover 5 can be made redundant by making said legs of branches of optical the element 6 impinge or contact the external cover 7 directly.

German publication DE 102007013082 D2 of prior art search discloses a signal light for a brake light. It describes two elongated legs or branches that decouples light in two different directions.

It can be seen that weight, size and thickness of optical structures and elements has been considered in illumination and signalling systems of the prior art. Document EP-947761 D10 of prior art search discloses a number of lenses for achieving weight reduction. Output lenses are built with a series of internal ribs of varying thickness. These arrangements, also known as Fresnel lenses, achieve substantial weight reductions and an acceptable optical behaviour.

An embodiment of the present invention describes an optical element 6 with a first light input surface defining a first leg or branch and a second light input surface 6c defining a second leg or branch, wherein said first and second legs or branches are arranged so as to achieve a light weight optical element 6.

The optical element 6 with light input optical surfaces disposed as legs or branches allows the manufacture of light optical elements. Material bridging legs is made redundant as no reflected of scattered light will enter that area.

Confronted with limited space, the present invention provides and embodiment wherein a system can simultaneously accommodate two signalling functions and yet be compact.

In said embodiment the optical element 6 includes a first light input surface 6a optically connected to one first light emitting diode LED-1. It also includes a second light input surface 6c optically connected to a second light emitting diode LED-2, wherein said optical element 6 is configured for directing light coming for said first and second light emitting diodes LED-1, LED-2 onto a common light output surface 6b, whereby said first light emitting diode LED-1 and said second light emitting diode LED-2 have a signalling function, typically a DRL function and a blinker function.

Thus, by fitting simultaneous signalling functionalities in a common output surface in rear-view mirrors scarce space can be spared.

Figure 4A:
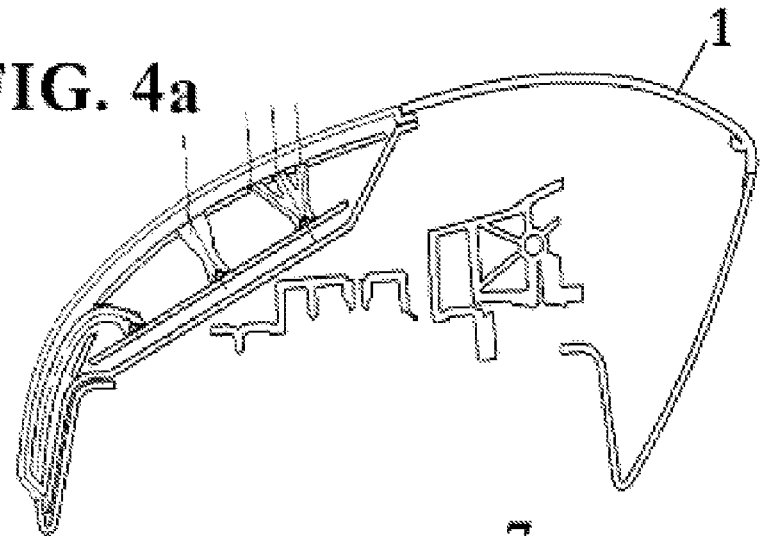
FIG. 4a shows an embodiment where light from one or more of the light emitting diodes is guided onto a vehicle rear direction.
Figure 4B:
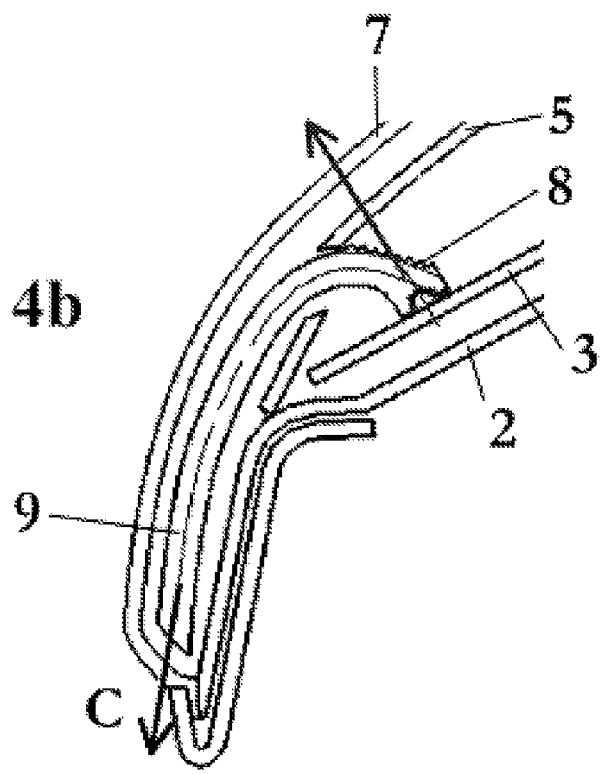

FIG. 4b shows details of an optical element that constitutes a waveguide 9 redirecting light to a rear point direction C. This arrangement allows lights, specially signalling lights and blinkers, to be seen from rear and side positions.

Furthermore, certain optical element 6 designs can reveal themselves are incapable of offering sufficiently large light reflection. In such cases the outer surface of the optical element 6 is preferably mirrored. Light which would escape the optical element 6 is redirected or piped back inside the optical medium of the optical element.

Figure 5:
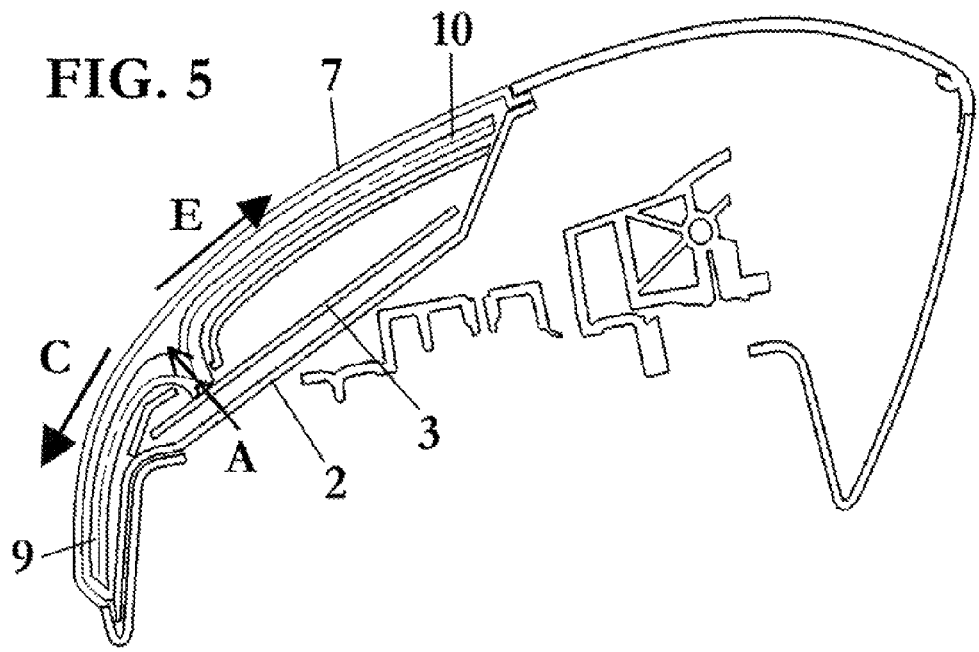
FIG. 5 shows a single light emitting diode with light guiding elements directing light to opposing direction.
Figure 6:
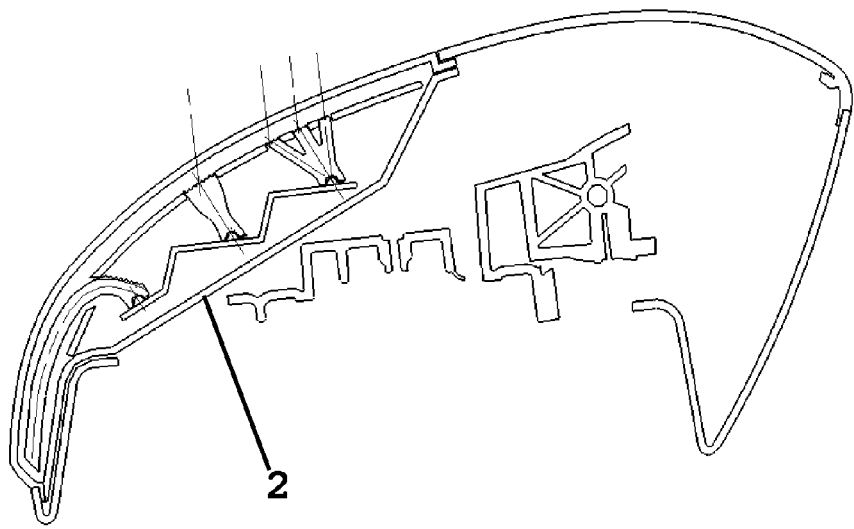
FIG. 6 shows an embodiment of the assembly of the invention wherein the circuit board is a single piece arranged in a series of steps.
Figure 7:
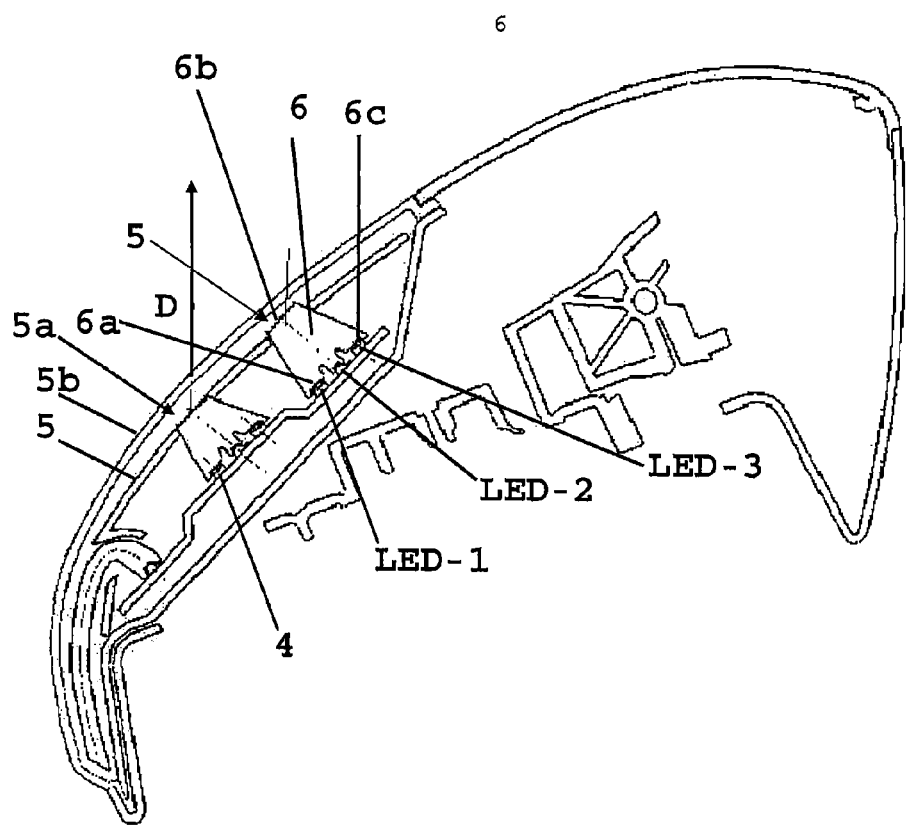
FIG. 7 shows another embodiment wherein each of the prisms or optical elements have a one or two input surfaces, each one facing a different LED, and one output.

FIG. 5 shows two waveguides 9,10 for redirecting light in opposing directions C and E. Other light sources, the light emitting diodes are not shown in this particular FIG. 5.

According to another embodiment of the invention, the external rear-view mirror assembly comprises a housing 1, a circuit board 3 supporting a plurality of LEDs LED-1, LED-2, an opaque cover 5 arranged in front of the circuit board 3 and provided with a plurality of through holes 5a, said cover having a shape adapted to the front external surface 1a of the rear-mirror 1, and it comprises at least a prism 6 with a first surface 6a in contact with at least a LED 4, and a second surface 6b fitting within at least one of said holes 5a and aligned with the front external surface 5b of the cover 5, said second surface 6b being a Fresnel lens adapted to direct the light coming from said LED 4 in a predetermined direction D.

Directing light in opposite direction makes visibility and signalling of vehicle operations an easier task.

The invention claimed is:

1. An external rear-view mirror assembly comprising:
   a housing;
   a circuit board supporting a plurality of LEDs;
   an opaque cover arranged in front of the circuit board and provided with a plurality of through holes, said cover having a shape adapted to a front external surface of the external rear-view mirror;
   wherein the external rear-view mirror comprises at least a prism with a first surface in contact with at least an LED of the plurality of LEDs, and a second surface fitting within at least one of said through holes and aligned with the front external surface of the opaque cover;
   wherein said second surface is a Fresnel lens adapted to direct light coming from said LED in a predetermined direction; and
   wherein the prism comprises two or three legs, each one fitting in a different through hole of the cover, the first surface being in contact with one LED of the plurality of LEDs, such that a signaling or a vehicle day running light function can exit in different points.

2. The external rear-view mirror assembly according to claim 1, wherein the light emitting diodes have a signaling function.

3. The external rear-view mirror assembly according to claim 1, comprising at least one of:
   one of the light emitting diodes configured to have a vehicle day running light function; and
   one of the light emitting diodes configured to have a blinker function.

4. The external rear-view mirror assembly according to claim 1, wherein said predetermined direction is the driving direction of a vehicle with which the external rear-view mirror assembly is associated.

5. The external rear-view mirror assembly according to claim 1, wherein the prism comprises one second surface fitting within at least one of said holes and aligned with the front external surface of the cover, and two or three input surfaces, each one facing a LED.

6. The external rear-view mirror assembly according to claim 1, wherein the circuit board is flat.

7. An assembly having a housing, the assembly comprising:
- a circuit board supporting a plurality of light emitting diodes;
- at least one optical element with a first light input surface optically connected to a first light emitting diode, with a second light input surface optically connected to a second light emitting diode; and
- a cover for the circuit board;
- wherein said optical element is configured for directing light coming from said first and second light emitting diodes onto a common light output surface;
- wherein said common light output surface is parallel to an external surface of said housing;
- wherein said optical element is configured for directing light coming from said first light emitting diode onto a predetermined direction;
- wherein said cover has at least one through hole attached to said common light output surface; and
- wherein both light emitting diodes have a signaling function.

8. The assembly according to claim 7, wherein the first light emitting diode is configured to have a vehicle day running light function.

9. The assembly according to claim 7, wherein said second light emitting diode is configured to have a blinker function.

10. The assembly for a vehicle according to claim 7, wherein said first light input surface faces said first light emitting diode through a gap and said common light output surface is in contact with said optical element.

11. The assembly according to claim 10, wherein said first light input surface defines a first leg or branch and wherein said second light input surface defines a second leg or branch, said first and second legs or branches arranged so as to achieve a light weight optical element.

12. The assembly for a vehicle according to claim 7, wherein said optical element is a non dispersive optical prism.

13. The assembly according to claim 7, wherein said common light output surface of the optical element is configured as a Fresnel lens.

14. An external rear-view mirror for a vehicle comprising an assembly according to claim 7.

15. An external rear-view mirror assembly comprising:
- a housing;
- a circuit board supporting a plurality of LEDs;
- an opaque cover arranged in front of the circuit board and provided with a plurality of through holes, said cover having a shape adapted to a front external surface of the external rear-view mirror;
- wherein the external rear-view mirror comprises at least a prism with a first surface in contact with at least an LED of the plurality of LEDs, and a second surface fitting within at least one of said through holes and aligned with the front external surface of the opaque cover;
- wherein said second surface is a Fresnel lens adapted to direct light coming from said LED in a predetermined direction; and
- wherein the prism comprises one second surface fitting within at least one of said holes and aligned with the front external surface of the cover, and two or three input surfaces, each one facing an LED of the plurality of LEDs.

16. The external rear-view mirror assembly according to claim 15, wherein the light emitting diodes have a signaling function.

17. The external rear-view mirror assembly according to claim 15, comprising at least one of:
- one of the light emitting diodes configured to have a vehicle day running light function; and
- one of the light emitting diodes configured to have a blinker function.

18. The external rear-view mirror assembly according to claim 15, wherein said predetermined direction is the driving direction of a vehicle with which the external rear-view mirror assembly is associated.

19. The external rear-view mirror assembly according to claim 15, wherein the prism comprises two or three legs, each one fitting in a different through hole of the cover, the first surface being in contact with one LED, such that a signaling or a vehicle day running light function can exit in different points.

20. The external rear-view mirror assembly according to claim 15, wherein the circuit board is flat.

21. The external rear-view mirror assembly of claim 7, wherein the predetermined direction is the driving direction of a vehicle with which the assembly is associated.

* * * * *